(12) United States Patent
Ezrielev et al.

(10) Patent No.: US 12,470,373 B2
(45) Date of Patent: Nov. 11, 2025

(54) IMPROVING DECENTRALIZATION OF LAST RESORT RECOVERY USING SECRETS

(71) Applicant: Dell Products L.P., Round Rock, TX (US)

(72) Inventors: Ofir Ezrielev, Be'er Sheba (IL); Lee Serfaty, Be'er Sheba (IL); Yehiel Zohar, Sderot (IL)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 18/306,024

(22) Filed: Apr. 24, 2023

(65) Prior Publication Data

US 2024/0356740 A1 Oct. 24, 2024

(51) Int. Cl.
*H04L 9/08* (2006.01)

(52) U.S. Cl.
CPC ............ *H04L 9/085* (2013.01); *H04L 9/0866* (2013.01)

(58) Field of Classification Search
CPC .............................. H04L 9/085; H04L 9/0866
See application file for complete search history.

(56) References Cited

U.S. PATENT DOCUMENTS

| | | | |
|---|---|---|---|
| 6,748,084 B1 * | 6/2004 | Gau | H04L 9/085 713/180 |
| 8,181,016 B1 | 5/2012 | Borgia et al. | |
| 9,652,617 B1 | 5/2017 | Evans et al. | |
| 10,412,097 B1 | 9/2019 | Banshats et al. | |
| 10,601,816 B1 | 3/2020 | Stickle et al. | |
| 10,903,991 B1 | 1/2021 | Craige et al. | |
| 11,057,210 B1 | 7/2021 | Sierra et al. | |
| 11,722,491 B1 | 8/2023 | Al-Rashid et al. | |
| 11,914,696 B1 | 2/2024 | Saxe et al. | |
| 12,154,047 B1 | 11/2024 | Govindan et al. | |
| 12,299,173 B2 | 5/2025 | O'Neil et al. | |
| 2002/0184493 A1 | 12/2002 | Rees | |
| 2003/0159032 A1 | 8/2003 | Gerck | |
| 2007/0223702 A1 | 9/2007 | Tengler et al. | |
| 2009/0283597 A1 | 11/2009 | Charles et al. | |
| 2011/0022883 A1 | 1/2011 | Hansen | |
| 2012/0016723 A1 | 1/2012 | Valles et al. | |

(Continued)

FOREIGN PATENT DOCUMENTS

WO 2016/205886 A1 12/2016

OTHER PUBLICATIONS

Gunther Schiefer et al., "Security in a Distributed Key Management Approach," 2017, pp. 816-821. (Year: 2017).

(Continued)

*Primary Examiner* — Sangseok Park
(74) *Attorney, Agent, or Firm* — Workman Nydegger

(57) ABSTRACT

Reinstating access to a system of an admin whose certificate is invalid or expired is disclosed using a secret that is remapped. When the admin's certificate is expired, the admin may send a request for reinstatement to tenant admins. The voting operation is based on shares of a secret that have been distributed to validators. When the shares are successfully reconstructed to obtain the secret, the voting operation is affirmed or allowed to proceed. The secret is remapped after a period of time. Remapping the secret includes creating a new secret and distributing new shares of the new secret to a different set of validators.

16 Claims, 10 Drawing Sheets

(56) References Cited

U.S. PATENT DOCUMENTS

| | | |
|---|---|---|
| 2014/0195546 A1 | 7/2014 | Ren |
| 2016/0140335 A1 | 5/2016 | Proulx et al. |
| 2016/0277411 A1 | 9/2016 | Dani et al. |
| 2016/0350874 A1 | 12/2016 | Santos et al. |
| 2018/0032750 A1 | 2/2018 | Hammel |
| 2018/0241747 A1 | 8/2018 | Tanaka et al. |
| 2019/0305938 A1 | 10/2019 | Sandberg-Maitland et al. |
| 2020/0036707 A1 | 1/2020 | Callahan et al. |
| 2020/0242232 A1 | 7/2020 | Machani |
| 2020/0351083 A1 | 11/2020 | Bartolucci et al. |
| 2020/0382327 A1 | 12/2020 | Mokhasi et al. |
| 2020/0412542 A1 | 12/2020 | Bartolucci et al. |
| 2021/0006418 A1 | 1/2021 | Wei |
| 2021/0064759 A1 | 3/2021 | Lomonaco et al. |
| 2021/0081520 A1 | 3/2021 | Howarth et al. |
| 2021/0133359 A1 | 5/2021 | Liu |
| 2021/0182423 A1 | 6/2021 | Padmanabhan |
| 2021/0258298 A1 | 8/2021 | Pattar et al. |
| 2021/0289033 A1 | 9/2021 | Ahuja |
| 2022/0076253 A1 | 3/2022 | Chaum |
| 2022/0076518 A1 | 3/2022 | Byun |
| 2022/0182239 A1 | 6/2022 | Hassanzadeh et al. |
| 2022/0271933 A1* | 8/2022 | Chen ................ H04L 9/085 |
| 2022/0342980 A1 | 10/2022 | Myers |
| 2023/0401307 A1 | 12/2023 | Pop et al. |
| 2024/0086550 A1 | 3/2024 | Tamir et al. |
| 2024/0154988 A1 | 5/2024 | Yates |
| 2024/0163305 A1 | 5/2024 | Fridman |
| 2024/0171589 A1 | 5/2024 | Ezrielev et al. |
| 2024/0171602 A1 | 5/2024 | Ezrielev et al. |
| 2024/0305643 A1 | 9/2024 | Ezrielev et al. |
| 2024/0380585 A1* | 11/2024 | Arora ................ H04L 9/3231 |

OTHER PUBLICATIONS

Mohammad Faraji et al., "Identity Access Management for Multi-tier Cloud Infrastructures," 2014, pp. 1-9 (Year: 2014).

* cited by examiner

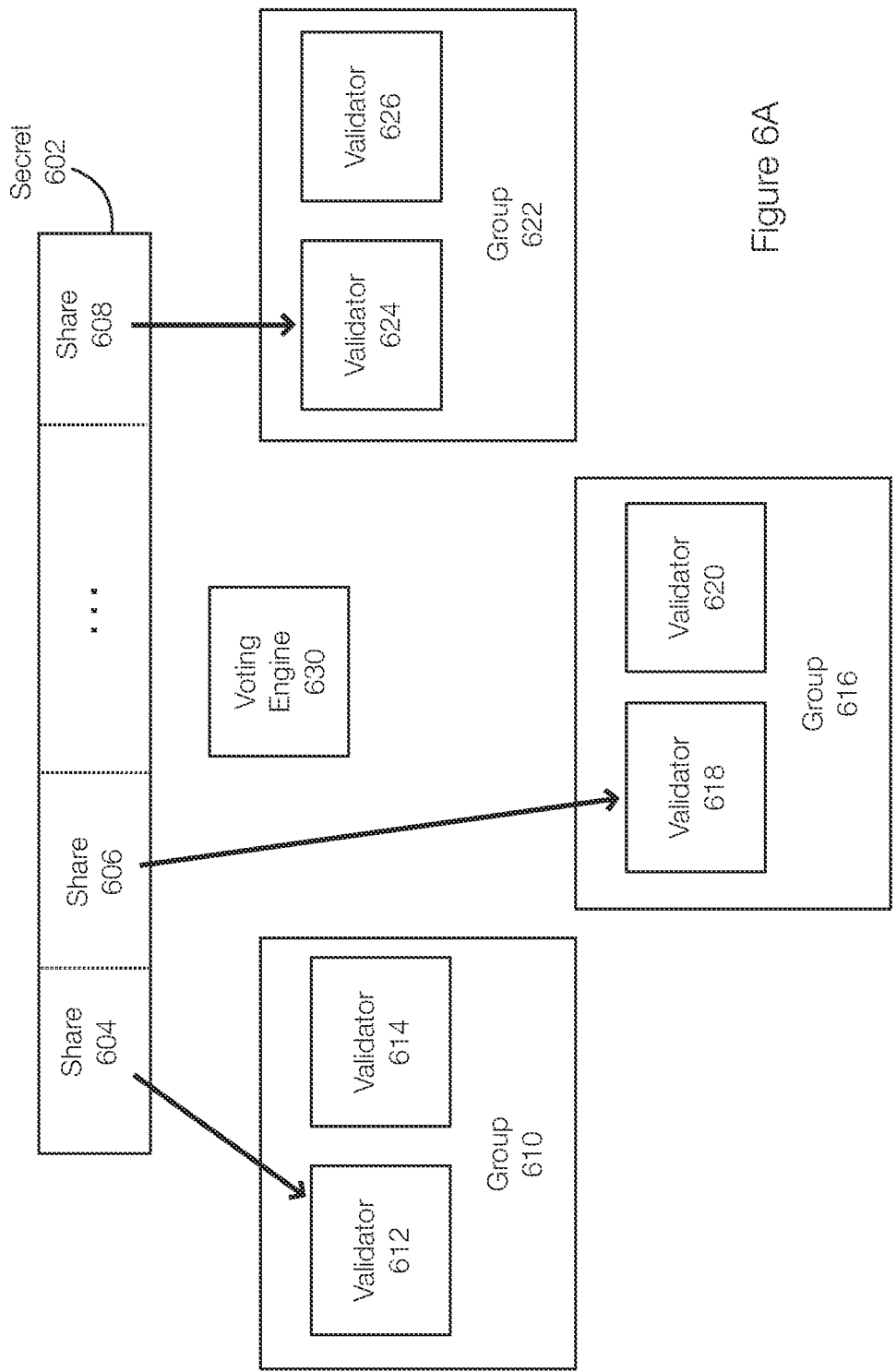

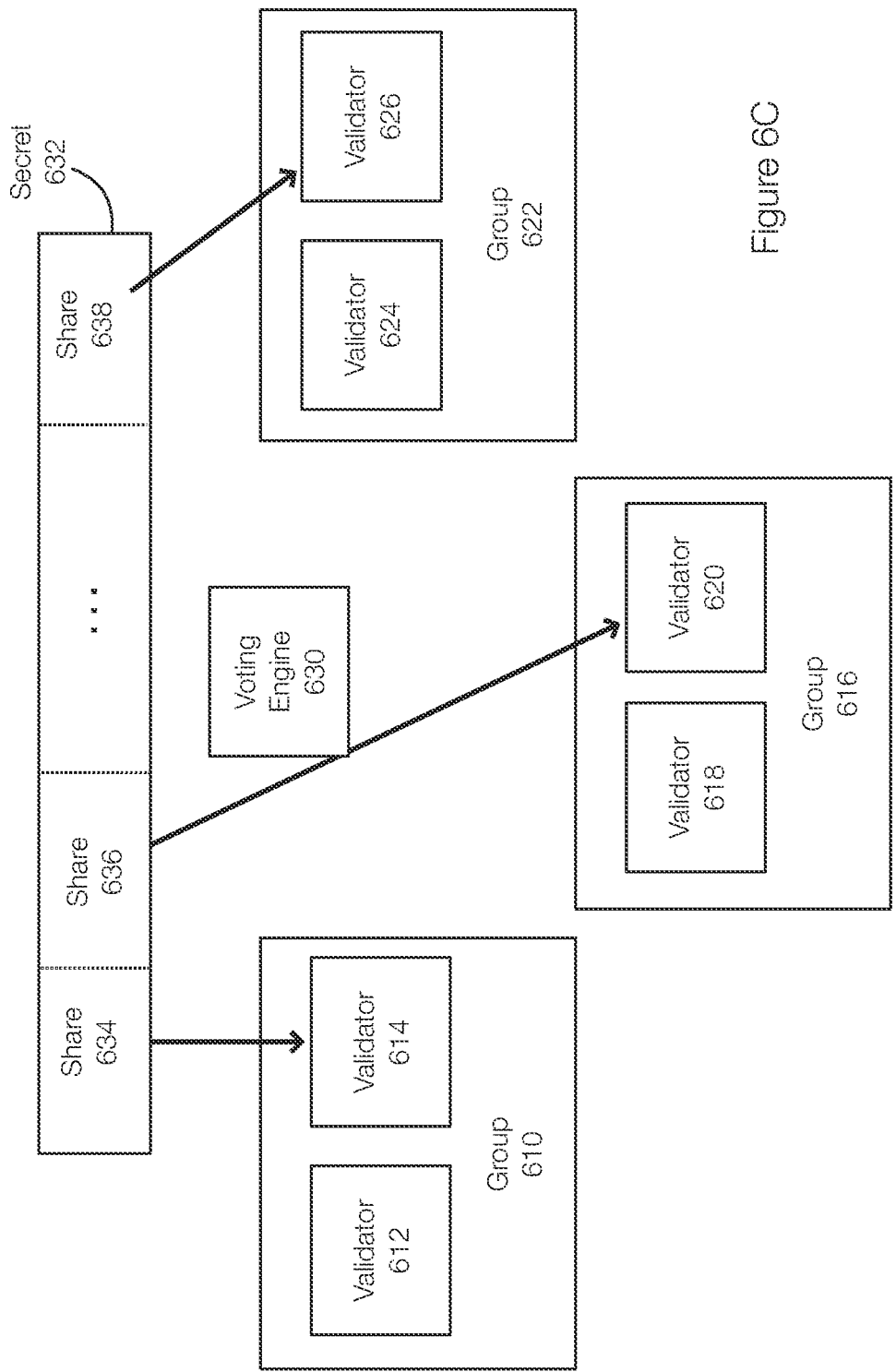

IMPROVING DECENTRALIZATION OF LAST RESORT RECOVERY USING SECRETS

RELATED APPLICATION

This application is related to U.S. application Ser. No. 18/057,287 filed Nov. 21, 2022, and U.S. application Ser. No. 18/181,086 filed Mar. 9, 2023, which applications are incorporated by reference in its entirety.

FIELD OF THE INVENTION

Embodiments of the present invention generally relate to identity and access control and management. More particularly, at least some embodiments of the invention relate to systems, hardware, software, computer-readable media, and methods for recovering access, including administrator access, to identify and access management systems.

BACKGROUND

Computing environments and systems may include a mixture of on-premise systems and cloud or edge-based systems. As these systems operate, data in these systems may originate at various locations and may be transmitted from one location to another location. For example, an entity may move data from on-premise locations to cloud or edge locations and vice versa.

It is beneficial and important to protect the data in these systems and to protect or control access to the data. To protect and/or control access to data, an entity may employ various strategies such as a zero-trust strategy. In a zero-trust strategy, no user, device, or network traffic is trusted by default. This type of strategy helps eliminate or at least reduce various security vulnerabilities.

One aspect of these data protection strategies relates to user authentication and access control. A common way to protect data or control access is to use basic username/password authentication. This type of authentication, however, may not provide sufficient long-term security. Certificate based authentication and access control is viewed as more secure.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIGS. 6A-6C disclose aspects of remapping shares among validators;

DETAILED DESCRIPTION OF SOME EXAMPLE EMBODIMENTS

Figure 1:
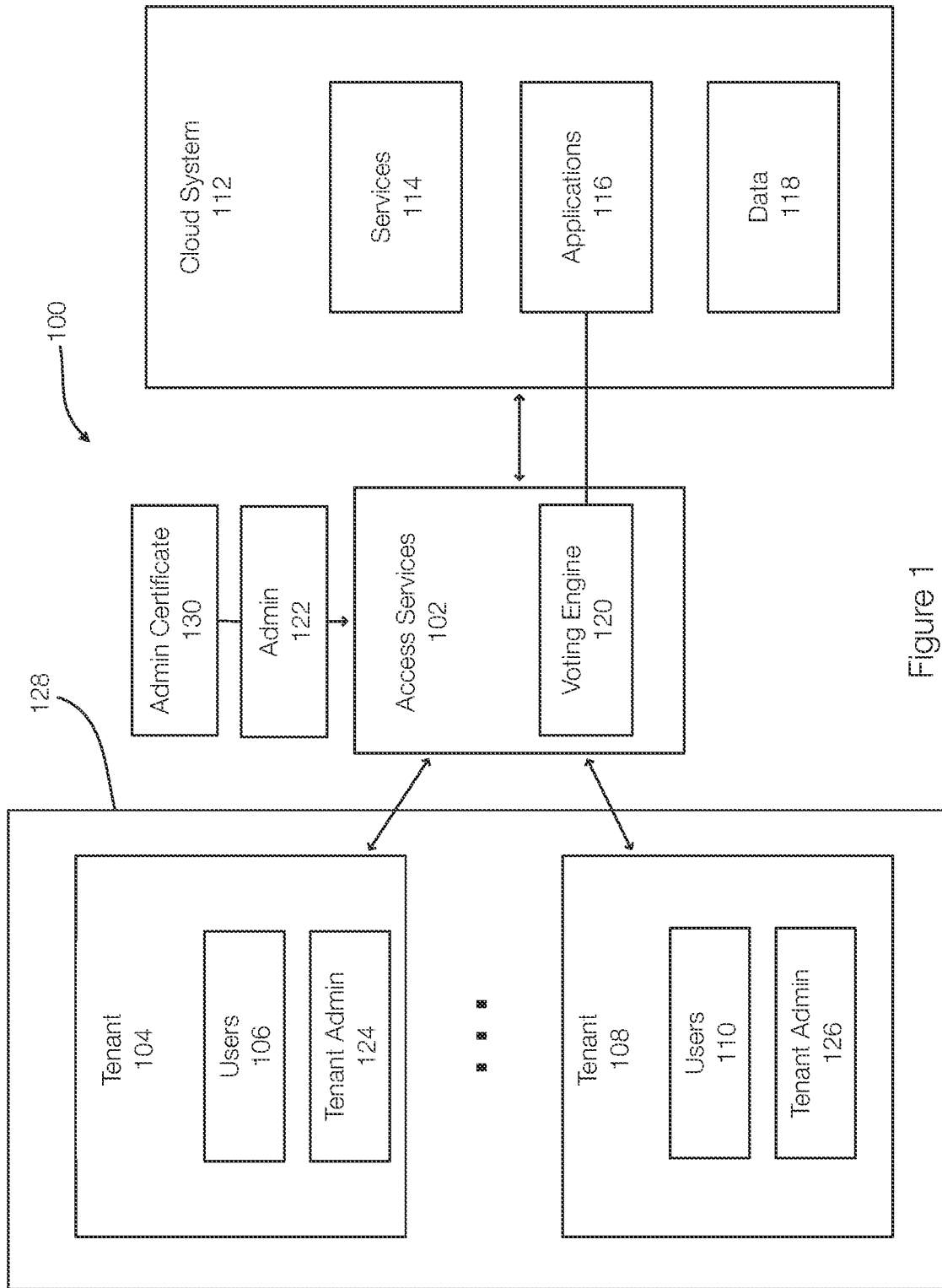
FIG. 1 discloses aspects of an environment that allows a user to request reinstatement as an admin when their certificate is not valid or has expired.

Embodiments of the present invention generally relate to identity and access management. More particularly, at least some embodiments of the invention relate to systems, hardware, software, computer-readable media, and methods for restoring access to an administrator (admin) or other user that has lost access to a system.

More specifically, example embodiments of the invention relate to restoring access to identity and access management systems or services (referred to herein as access services). Common/Customer Identity and Access Management (CIAM) is an example of access services. Access services may control or manage client/user authentication, control data access, or the like. Access services ensure that customers can receive consistent configurations and capabilities across their application deployments in computing environments.

In a multi-tenant environment, access services may be managed by an administrator (admin). Each tenant is managed by a tenant administrator (a tenant admin). These admins may also be associated with specific roles or permissions. An admin of the access services, for example, may have roles or permissions that allow the admin to perform operations or determine settings that impact multiple tenants. A tenant admin is limited to roles and permissions of a specific tenant. The admins and the tenant admins represent different admin classes that have different privileges in a computing environment.

By way of example, access services may perform or include basic authentication such as username/password or perform certificate-based authentication using mTLS (mutual Transport Layer Security) via a REST API (Representational State Transfer Application Programming Interface). Authentication performed using mTLS is generally more secure than basic authentication.

During an mTLS handshake, the certificate of the admin is validated against the trusted root CA (Certificate Authority). Invalid certificates (CA or server) may cause the mTLS handshake process to fail. Consequently, the requested access may fail or be denied. This may lead to a scenario where the admin does not have access to the access services. For example, an admin may attempt to access the access services and if the admin's certificate has expired, access will be denied or fail.

Embodiments of the invention relate to restoring access to the admin and, more specifically, to restoring access to the admin when the admin's certificate is invalid (e.g., expired). This may include installing a new certificate for the admin in the access services.

As previously stated, access services may authenticate clients using mTLS (mTLS handshake) via a REST API. This type of authentication ensures that the clients or users at each end of a network connection are who they claim to be by verifying that they both have the correct private key. The information included in their respective TLS (or other) certificates provides additional verification.

More specifically, when initiating access services (e.g., registering a new user) or when preparing to implement TLS, a public/private key is generated for a user. The private key is private to the user and should be kept secret. The public key may be included in the certificate that may be shared with others. Once the certificate is generated and signed by a certificate authority (CA), the certificate may be installed. Each user/device is typically associated with a role, permissions, and/or a certificate. These certificates are used to authenticate identity.

During the TLS handshake operation, a client encrypts data using the public key included in a server's certificate. The server will only be able to decrypt the data if the server has the corresponding private key. This process may be performed in both directions from client to server and from server to client. This allows the client to confirm that the server is who the server claims to be and allows the server to confirm that the client is who the client claims to be. This process requires the client and the server to use their respective private keys.

Trust in certificate-based authentication is further improved using certificate authorities. The certificate authority is, in effect, a trusted third party. The certificate may include data that has been encrypted with the certificate authority's private key. Alternatively, the certificate has been signed by the certificate authority's private key and can be decrypted with the certificate authority's public key. This process may be further adapted to include root and intermediate certificate authorities. Processing a certificate that is signed by a trusted certificate authority provides further trust in the identity of the client and in the identity of the server.

A TLS certificate is a data file that includes, by way of example, information for verifying a server's identity or a device's identity and includes the public key, a statement of who issued the certificate (e.g., the CA), and the certificate's expiration date.

To make sure that an admin of access services can always access the access services, two options are available by way of example. The first option is to configure a client with an admin role with basic authentication (username/password) and the second option is to configure the client with the admin role with mTLS and ensure that its server certificate and certificate authority certificate are valid. However, the first option may not be sufficiently secure in the long term. The second option is more secure, but the admin may forget to renew or replace their certificates. If the admin's certificate expires or is invalid, the admin cannot access or manage the access services.

If the certificate of an admin (e.g., the admin of the access services) is expired or otherwise invalid, embodiments of the invention relate to restoring access for the admin and allowing a new certificate for the admin to be generated and/or installed.

FIG. 1 discloses aspects of a multi-tenant system including or associated with access services. The multi-tenant system 100 may include on-premise, edge, and/or cloud computing systems and machines. FIG. 1 illustrates tenants 128, represented by tenants 104 and 108, of a cloud system 112. The cloud system 112 may include or provide, by way of example only, services 114, applications 116, and data 118 to the tenants 128.

Each of the tenants 128 may use at least some of the same services 114 and applications 116 (and may use the same instance of an application). The data 118, which may be stored in storage devices, may include the data of each of the tenants 128. However, the cloud system 112 is configured to keep data of the tenant 104 independent and separate from the data of the tenant 108. The data of any particular tenant is never available or accessible by any other tenant unless consent is provided.

The tenant 104 may include users 106, which also represents devices that may access the cloud system 112 (e.g., client devices) and a tenant admin 124, which may also include or be associated with a tenant admin device. The tenant 108 may similarly include users 110 and a tenant admin 126.

The access services 102 is configured to control and manage identity and access of the tenants 128 to the cloud system 112. This access services 102 may include authentication, access control, customer registration, account management, consent, management, directory services, and the like or combination thereof.

The access services 102 is controlled or managed by an admin 122. The admin 122 (as well as the tenant admins 124 and 126 and the users 106 and 110) may also be registered with the access services 102 and may be associated with roles, privileges, or the like. Devices may be similarly registered. Thus, the admin 122 (as well as the tenant admins 126 and 126 and users 106 and 110) may be able to perform certain operations from certain devices. Alternatively, the admin 122 (or other tenant admin or user) may be able to perform their roles and permissions from any device as long as properly authenticated.

In this example, the users 106, 110, the tenant admins 124, 126, and the admin 122 are each associated with a certificate. The admin certificate 130 of the admin 122 is illustrated in FIG. 1. The certificates are typically used, including in a zero-trust strategy, whenever access is requested or when any operation is performed. In one example, the certificates may be used for authentication while roles or permissions may be used to control access after authentication.

In one example, the admin certificate 130 may expire or be invalid for other reasons. This prevents the admin 122 from accessing the access services 102 and thus may have an impact on the operation of the access services 102.

The access services 102 is configured with a voting engine 120 that may be invoked or used in order to reinstate the admin 122 and install a new certificate for the admin 122. Thus, the voting engine 120 is configured to reinstate the admin 122 in the event that the admin certificate 130 expires or is invalid for other reasons.

If the admin 122 is unable to access the access services 102, the admin 122 may attempt to reinstate its certificate (e.g., have a new certificate installed). Initially, the admin 122 may contact one or more of the tenant admins 124 and 126 to notify them that the admin 122 is locked out. The admin 122 may send a new valid certificate to those clients (the tenant admins 124 and 126) at the same time or at another time during the reinstatement operation. The request from the admin 122 should inform the tenant admins 124 and 126 of the admin's identity.

One of the tenant admins, such as the tenant admin 124, may invoke the voting engine 120 using, for example, a REST API. The request may include characteristics of the admin 122. For example, the request may include information indicating how the tenant admin 124 verified the identity of the admin 122. The tenant admin 124, for example, may perform an identify test by asking for specific information, reviewing information provided by the locked-out admin, or the like.

The tenant admin 124 may indicate that the admin 122 provided a secret word, sent an email, a text, or the like. The other tenant admins are notified that they can vote on whether they recognize the admin being recommended for reinstatement that was included or identified in the request. The tenant admins 124 and 126 may vote on reinstating the admin and if a threshold consensus is reached (a quorum of yes votes), the admin 122 may be restored. The consensus may be a percentage of possible or eligible votes. In one example, the threshold is 100%, but the threshold may be less than 100%.

If the voting process is successful, the initiating tenant admin (tenant admin 124 in this example) may be able to add the new certificate of the admin 122, which was previously received from the admin 122, to the access services 102 such that the admin 122 regains access to the access services 122.

The voting engine 120, upon receiving a request from the tenant admin 124 and prior to allowing voting, may ensure that no admin of the access services 102 has basic authentication options enabled and may confirm that no admin user has mTLS certificate-based options available. The tenant admins 124 and 126 may vote by accessing a certain URL, selecting "yes" or "no" on a webpage presented by the voting engine 120, or in other manner. The voting may be achieved using a digital questionnaire or in another manner. The voting engine 120 may collect and tabulate the votes and if the decision to reinstate is affirmative, initiate the installation of the new certificate for the admin 122.

FIG. 1 also illustrates that the applications 116 (and/or services 114) may vote. The voting engine 120 may collect information from the admin 122 that relates to information that may be accessed from, stored by, or relevant to the applications 116 (or services 114). The information collected from the admin 122 can be verified by the applications 116 against information/data of the applications 116. When there is a match for a given application, an affirmative vote may be generated at the voting engine 120. For example, an application may verify information from a user related to logs (e.g., what was the most recent action or set of actions performed by the admin prior to losing access).

In one example, to provide additional security, the admins or tenant admins that vote may be required to provide a key or password or other identifier (referred to generally herein as a secret). In one example, the secret may be divided into pieces or shares and distributed to some of the voters (e.g., tenant admins, other admins, applications, or the like or combinations thereof). The voters that receive shares may be referred to as validators to reflect that they have received a share of the secret. When voting is performed, the validators provide their shares to the voting engine. If the secret can be reconstructed from the shares, the voting is deemed successful or allowed to proceed. In one example, shares of the secret are distributed to a group of validators. Thus, some of the voters may not receive a share of the secret.

In the context of restoring the certificate of or access of the admin 122, the relevant group of voters may be the tenant admins. However, the group of voters for a given operation may depend on the purpose of the vote. For example, the ability of an admin to perform a critical operation may depend on the vote of other equally privileged admins (same level or class of admin). In some examples, applications may also be able to vote.

The secret may be distributed to the validators using Shamir's Secret Sharing (SSS). In SSS, the secret is divided into parts or shares. The secret can be reassembled only when a sufficient number of shares (e.g., a quorum or other determined number) are combined. Alternatively, the secret and/or shares may be configured such that all shares are needed to reconstruct the secret. In the context of voting, the validators are required to provide their share. The voting operation may proceed after the secret is determined from or reconstructed from the shares.

The shares, when reconstructed, may be a key used to decrypt an encrypted secret. Generally, however, an attacker cannot reconstruct the secret unless the attacker has acquired (e.g., stolen) a sufficient number of shares. As a result, performing a voting operation using shares of a secret improves security due to the need for an attacker to acquire multiple shares from multiple validators.

Figure 2:
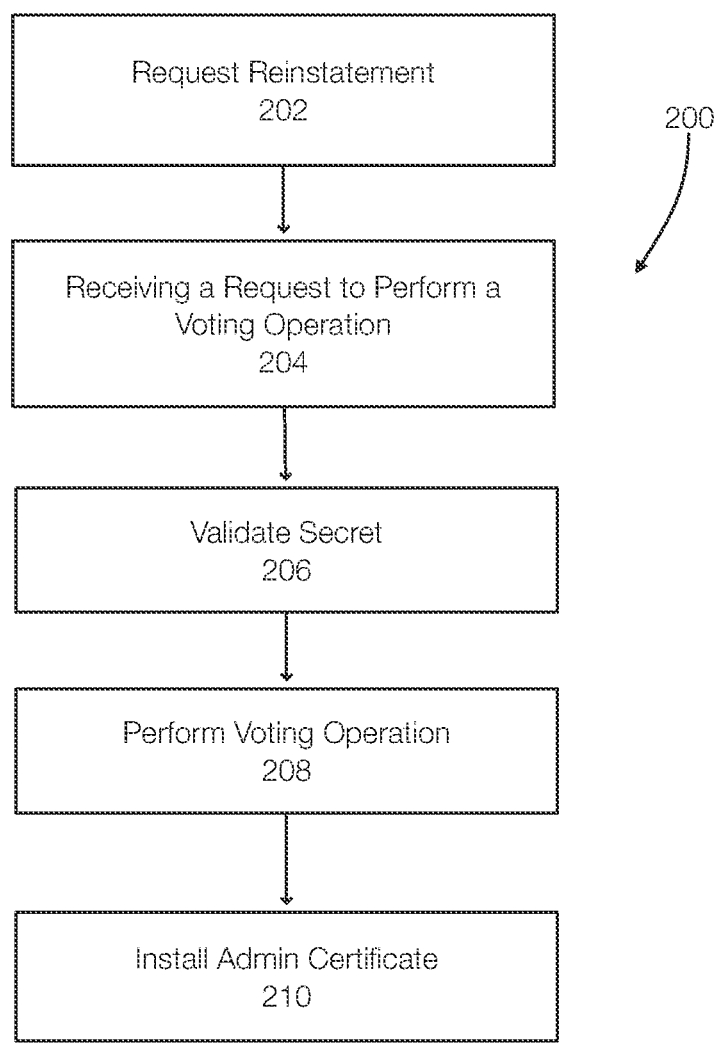
FIG. 2 discloses aspects of reinstating an administrator to a computing system or services such as access services.

FIG. 2 discloses aspects of reinstating an access services admin that has been locked out or prevented from accessing the access services. The method 200 may include performing 202 or receiving a reinstatement request. In one example, the admin of the access services may discover that their certificate has expired and that they cannot access the access services or perform operations on behalf of or for the benefit of the tenants.

In this example, the admin may contact the tenant admins and send a request for reinstatement, which is received by the tenant admins or their devices. The request may be achieved in any manner available to the admin. The voting engine may also allow the locked-out admin to access an API to request reinstatement. Identifying information may be collected from the locked-out admin at this time. In another example, the admin may send an email to the tenant admins to request reinstatement as the admin. The request for reinstatement may be sent by text, by email, by telephone, or the like. This also allows the tenant admins to verify the admin or to verify the identity of the admin requesting reinstatement by verifying the identity, such as by performing an identity test. Receiving a text or email from the admin may be sufficient for the tenant admins to confirm that the admin cannot access the access services and that the admin requesting reinstatement is the actual admin of the access services. In another example, the request from the admin may include a secret word or other key that is recognized by the tenant admins. The identity can be tested or recognized in other manners.

The request for reinstatement from the access services admin may include a new certificate of the admin, which cannot be installed or used by the admin because the admin is currently locked out of the access services. However, the admin can generate the new certificate at any time. The request for reinstatement may also include information that can be verified by an application.

Assuming that a tenant admin agrees with the request for reinstatement received from the admin, the tenant admin may issue or perform a request to perform a voting operation. For example, the admin receiving the request may verify data provided by the requestor, which is an example of testing the identity of the requestor. The request from the tenant admin may be received 204 at the access services or at a voting engine. This request may be performed using a REST API. The request to perform a voting operation may also include characteristics of the requestor requesting to be reinstated. For example, the tenant admin may fill out a digital form indicating how the tenant admin verified the identity of the admin requesting reinstatement.

Once a request to perform a voting operation is received, the secret may be validated 206. Validating 206 the secret may be as aspect of performing 208 a voting operation. Validating 206 the secret may be accomplished by receiving shares from the validators and attempting to reconstruct the secret. The ability to successfully reconstruct the secret may constitute a valid and successful vote. If the secret cannot be reconstructed (e.g., not enough shares, receiving counterfeit shares), the vote is not successful and/or may not be permitted. In the voting operation, the tenant admins may each be provided with a link (e.g., via email) from the voting engine to a web page that allows them to register their vote.

Alternatively, validating the secret may allow the validators to vote. Thus, when the voting engine is able to reconstruct the secret from the shares, the voting is completed or may proceed.

Alternatively, or in addition, validating the shares may be augmented by votes from other voters. In the voting operation, the tenant admins may each be provided with a link (e.g., via email) from the voting engine to a web page that allows them to register their vote.

The web page may include the information detailing how the identity of the admin was verified by the tenant admin that initiated the voting operation. The tenant admins may access a specific URL to register their vote. Before reinstating the admin, the voting operation may require a threshold approval level. The threshold level may be any percentage desired by the access services or by the tenants as a whole. The voting operation may be able to complete successfully and authorize or recommend reinstatement as long as a majority of a quorum of the tenant admins vote or if a quorum responds to the voting operation and satisfies a threshold level. In general, any mechanism that allows tenant admins to express their vote on reinstating the admin may be used. Typically, this is performed in a technical manner. Thus, clients may access a web page to automatically cast their digital vote or response to the request for reinstatement.

In the reinstatement of the admin is approved during the voting operation, the admin certificate is installed 210. As previously stated, the request for reinstatement may have included a new certificate. In one example, the tenant admin that initiated or sent the request to perform the voting operation (204) may be granted privileges that can be executed a single time and/or within a determined time period. This gives, in one example, the tenant admin privileges associated with the admin such that the new admin certificate can be installed or added to the access services.

Once the new certificate of the admin is installed 210, access to the access services is restored to the admin and the temporary privileges granted to the tenant admin may be revoked or terminated. Advantageously, instead of performing an arduous process to reinstate the admin, existing users, such as the tenant admins, can quickly validate the entity claiming to be the admin while maintaining required security measures.

Figure 3:
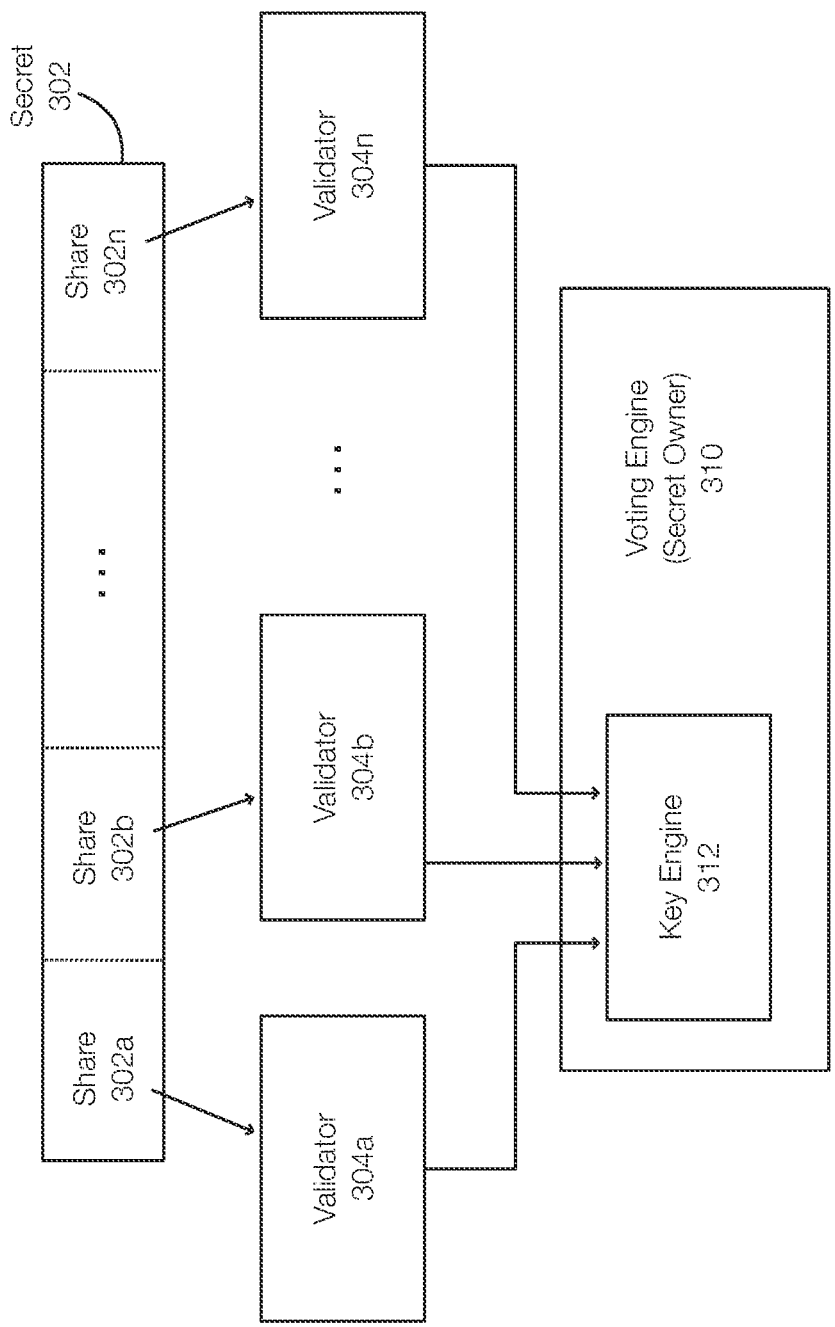
FIG. 3 discloses aspects of dividing a secret into shares, distributing the shares to validators, and voting operations based on shares of the secret.

FIG. 3 discloses aspects of performing voting operations using shares. FIG. 3 illustrates a secret 302. The secret 302, in one example, is known only to the secret owner, which may be the voting engine 310 in this example. The voting engine 310 may divide the secret into shares, represented by shares 302$a$, 302$b$, and 302$n$. The shares are distributed to validators, represented by validators 304$a$, 304$b$, and 304$n$. Each of the validators receives a share. In this example, each of the validators 304$a$-304$n$ is only aware of their corresponding share.

The shares 302$a$, 302$b$, and 302$n$, in one example, may be actual portions of the secret. In another example, the shares 302$a$, 302$b$, and 302$n$ are not actual portions of the secret 302 but are polynomial formulas that point to the secret 302. When a sufficient number of the polynomial formulas are available, the secret 302 can be constructed from less than all of the shares. In another example, the shares 302$a$, 302$b$, and 302$n$ may be overlapping portions of the secret such that the secret could be reconstructed from less than all of the shares. Embodiments of the invention, more generally, allow the secret 302 to be divided into shares that may have various forms and representations. As a result, reconstructing the secret 302, depending on how the secret 302 was divided, may require all of the shares, a majority of the shares, a specified quorum of the shares, or the like. In some examples, some of the shares may be deemed as required shares while others may be optional.

When a voting operation is initiated, the validators 304$a$, 304$b$, and 304$n$ may submit their share to a key engine 312. The key engine 312 then reconstructs the secret 302 if a sufficient number of shares have been received. If the secret 302 is successfully reconstructed, this constitutes a valid or successful vote and the administrator is reinstated.

In another example, voters that do not have a share may also vote as previously described. This may allow a vote to be deemed successful if an insufficient number of shares are received, but the total number of votes is above a threshold level. This example may assume that receiving a share constitutes a positive vote. If the secret cannot be reconstructed from the shares, the validators may be able to submit a vote. However, the voting engine 310 may prevent the voting operation from proceeding if the secret 302 cannot be reconstructed. For example, one of the shares may be counterfeit and additional security measures may need to be performed, such as rooting out the attacker that provided a counterfeit share or that has stolen a share, prior to reinstating the admin.

In another example, a validator may return or provide their share to the key engine or to the voting engine in a manner that verifies the source or identify of the share. For example, the validator 304$a$ may vote by signing their share 302$a$ and providing the signed share to the key engine 312. This allows the key engine 312 to verify that the share 302$a$ was received from the validator 304$a$ that received the share 302$a$ when the secret 302 was divided into shares and distributed to the validators.

Figure 4:
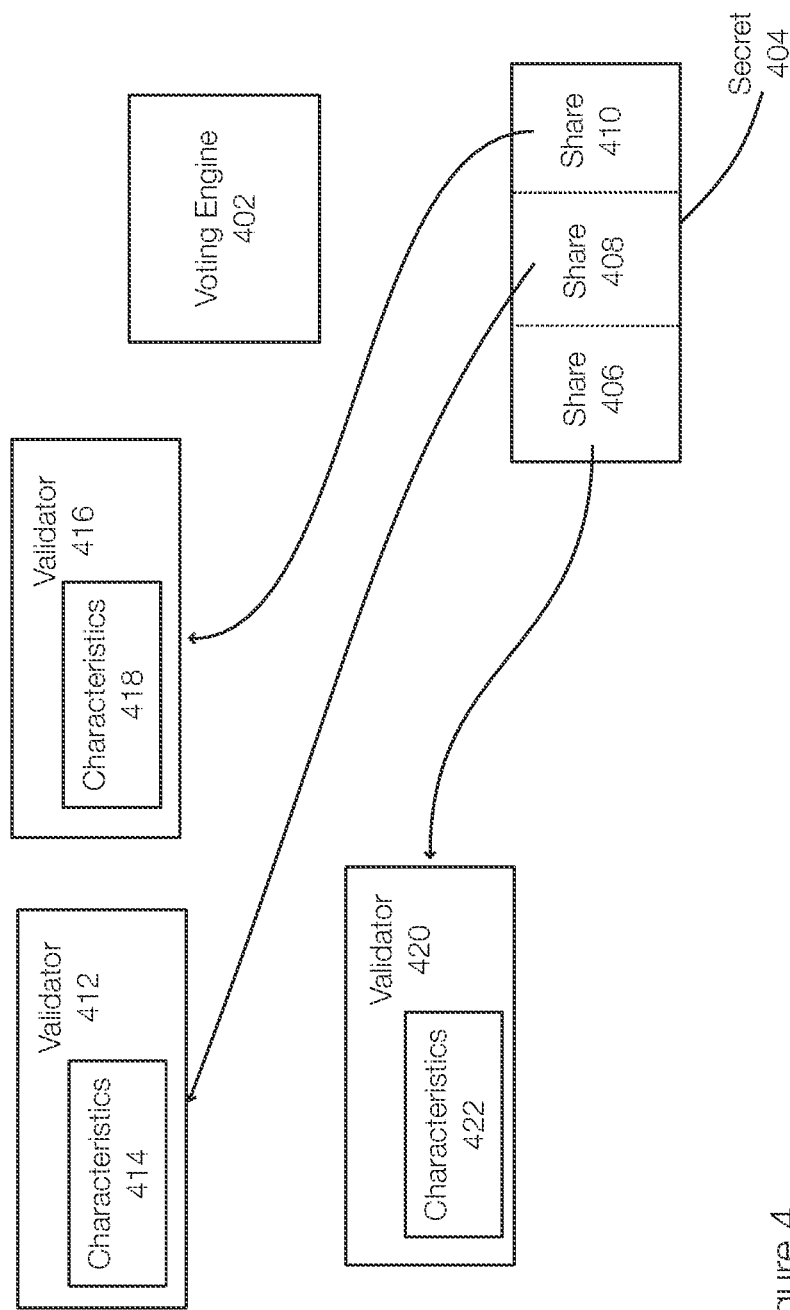
FIG. 4 discloses aspects of distributing shares to validators having different characteristics.

FIG. 4 discloses additional aspects of providing security in a computing environment. In one example, the voting engine 402 may consider the characteristics of the validators when assigning shares to the validators. Assigning shares to validators that have the same or similar characteristics or that use the same characteristics to verify the identity of the requestor may make the voting operation or validation operation less effective as each of the validators may use the same tests to validate a reinstatement or other request.

More specifically, a voting operation may include an attempt to reconstruct the shares of a secret. Before a validator provides their share and before the secret is reconstructed, the validator may verify the identity of the requestor. As a result, it may be beneficial to distribute the shares to validators that have different characteristics or that can perform identity tests using different characteristics such that the tests performed in response to an access recovery request are diverse and cover multiple areas.

The tests used to validate the identity of the requestor can vary. Further, diversifying the characteristics used to verify the requestor's identity may allow the number of validators to be reduced. For example, a tenant admin may verify the identity of a requestor when the requestor provides information known to the tenant admin. For example, the requestor may send a text using the tenant admin's telephone number, provide a previously arranged secret word, or other information that an attacker is unlikely to possess.

Example tests may include log-based tests, identity validation tests, digital asset sharing tests, geographical validation tests, and the like. A log-based test may require the requestor to provide information that may be stored in a log or that may be inferred from the log. For example, the log may indicate that memory requirements are increasing or decreasing or may indicate that the computing environment's temperature is increasing or decreasing. This can be verified by a tenant admin or by an application. For example, an application that maintains specific logs can verify a requestor based on information provided by the requestor. The requestor, for example, may provide recent actions within a specific time window that are included in the log. The ability to identify these transactions in the log may be used to verify the identity of the requestor.

The identity of a requestor can be verified when the requestor can verify ownership of digital assets. This type of information may be reflected in a block chain ledger for example. Identify validation tests may allow aspects of the requestor's identity to be queried. A geographical test may require the request to originate with an IP address in the appropriate geographical location.

As illustrated in FIG. 4, the validator 412 may be able to verify a requestor based on the characteristics 414, the validator 416 may be able to verify a requestor based on the characteristics 418, and the validator 420 may be able to validate the requestor based on the characteristics 422. In this example, the characteristics 414, 418, and 422 are all different.

For example, the validator 412 may validate the requestor based on characteristics 414 such as application or system logs. The validator 416 may validate the requestor using characteristics such as digital asset ownership. The validator 420 may validate the requestor using characteristics 422 such as identity-based characteristics.

Each of the validators 412, 416, and 420 received, respectively, a share 408, 410, and 406. When the identity tests performed by the validators 412, 416, and 420 are successful, the corresponding shares may be provided to the voting engine 402. The voting engine 402 may then reconstruct the shares and if the secret can be reconstructed successfully, the requestor may be validated and the request is granted.

In FIG. 4, the shares 406, 408, and 410 of the secret 404 have been distributed to validators based in part on their corresponding characteristics or based on their ability to test the requestor. This requires the requestor to pass multiple tests that test different aspects of the requestor's identity when reinstatement is requested. The voting engine 402 is thus configured, when distributing shares of the secret 404 to the validators, to consider the identity tests and characteristics the validators can test.

In one example, the pool of validators may be divided or classified according to their characteristics. This allows the voting engine 402 to distribute shares based on characteristics and ensure that the requestor is required to pass diverse types of identity tests.

Figure 5:
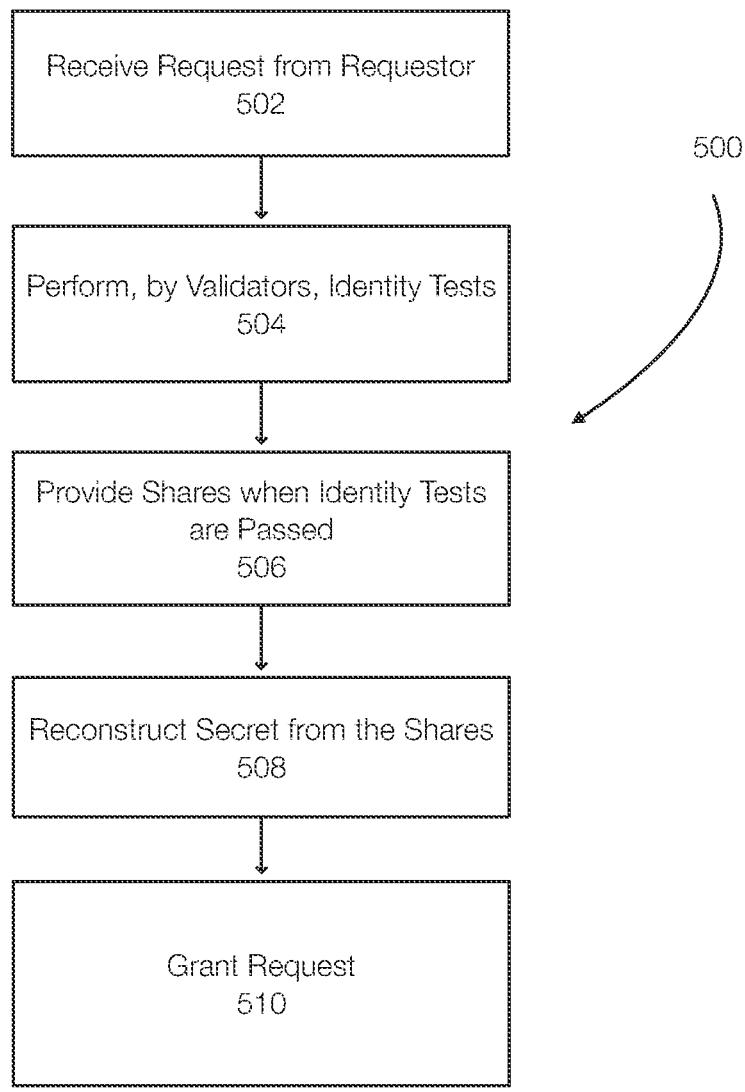
FIG. 5 discloses aspects of a method for reinstating a user as an admin when a secret is reconstructed from shares.

FIG. 5 discloses aspects of verifying a requestor's identity. The method 500 may include receiving 502 a request from a requestor. The requestor could be an attacker or a locked-out admin for example. The request may result in a voting operation that includes performing 504, by validators that each have a share of a secret, identity tests. The tests are diverse and allow the validators to verify or validate an identity of the requester using diverse characteristics that relate to the requestor and to the computing system, digital assets, geography, or the like.

Each validator that successfully identifies the requestor provides their share to the voting engine. Thus, the shares of a secret are provided 506 when the identity tests are passed successfully. The voting engine then attempts to reconstruct 508 the secret from the received shares. If the secret is reconstructed successfully, the request of the requestor is granted 510. This may be a request to be reinstated as an admin and have a new certificate installed.

Figure 6B:
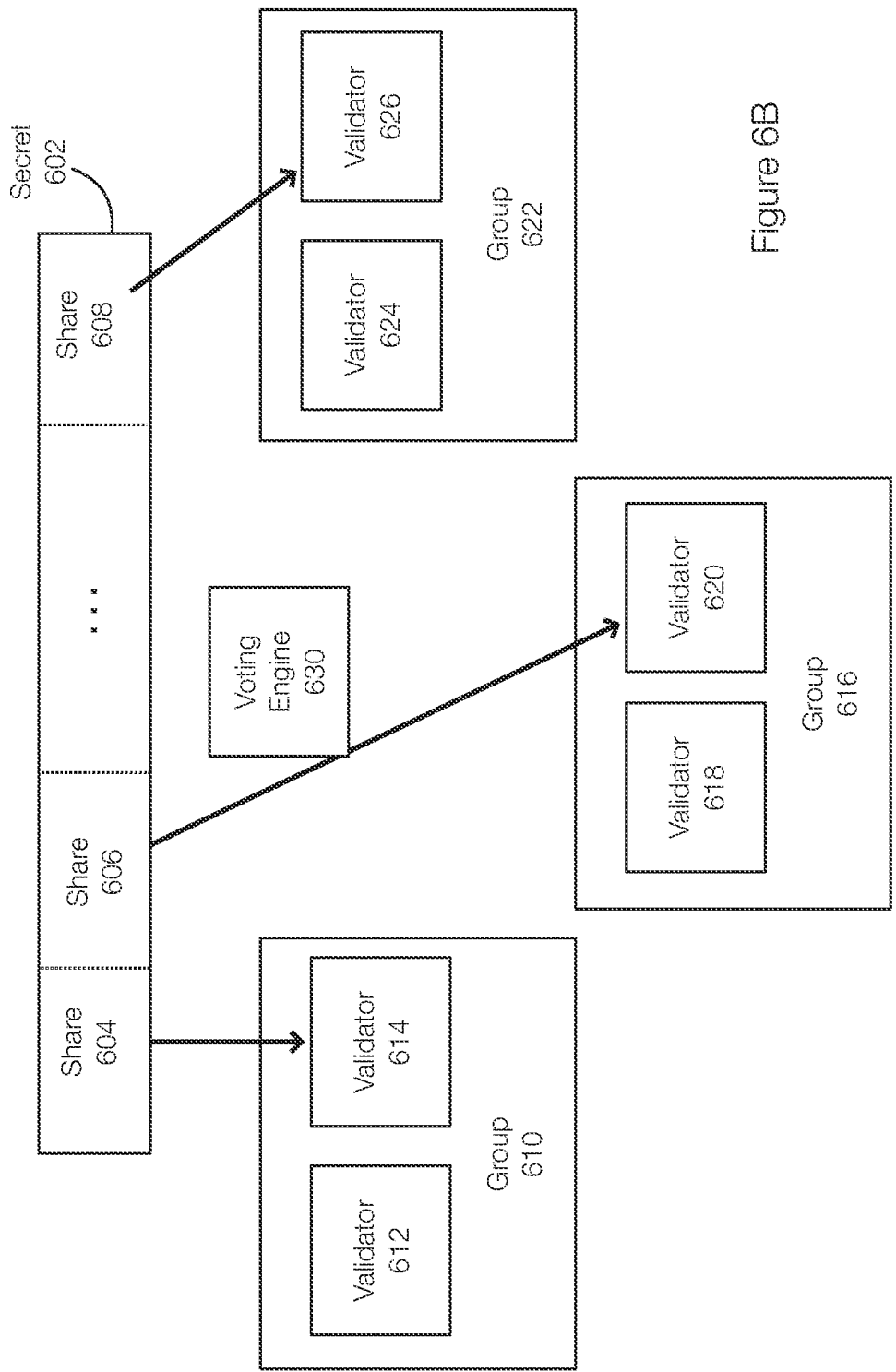

FIGS. 6A, 6B and 6C disclose aspects of mapping and remapping shares to validators. FIG. 6A illustrates a secret 602 that is divided into shares, represented by shares 604, 606, and 608. FIG. 6A further illustrates groups 610, 616, and 622. These groups 610, 616, and 622 may include validators that may perform identity tests using different characteristics. In this example, the group 610 includes validators 612 and 614. The group 616 includes validators 618 and 620. The group 622 includes validators 624 and 626.

The voting engine 630 may distribute the shares of the secret to validators in different groups. In FIG. 6A, the share 604 is distributed to the validator 612, the share 606 is distributed to the validator 618, and the share 608 is distributed to the validator 624.

FIG. 6B discloses aspects of remapping the shares. In FIG. 6B, the shares 604, 606, and 608 of the secret 602 have been remapped. More specifically, the share 604 is distributed to the validator 614 and the validator 612 no longer has the share or access to the share 604. Similarly, the share 606 has been redistributed to the validator 620 and the share 608 has been redistributed to the validator 626.

FIG. 6C discloses additional aspects of remapping the shares of a secret. In FIG. 6C, the voting engine 630 determines that the secret is to be remapped to the validators or changed. In this example, the secret 602 is void or invalid and a new secret 632 is generated. The shares of the secret 632 are distributed to the validators 614, 620, and 626. The shares associated with the secret 602 are not valid and only the shares 634, 636, and 638 of the new or latest secret 632 are valid.

FIGS. 6A-6C illustrate that a secret may be regenerated and divided into shares. Each time the secret is regenerated, the resulting shares are distributed to a different set of validators. FIGS. 6A-6C also illustrate that the shares are distributed to multiple groups that may perform identity tests using different characteristics. However, the shares may be distributed to a smaller number of groups. When the secret is redistributed, the shares may be distributed to validators in different groups.

FIGS. 6A-6C illustrate a secret rotation mechanism where the shares are redistributed periodically or based on another schedule or in an ad hoc manner. The secret rotation mechanism may include redistributing existing shares or generating a new secret and distributing the new shares to different validators. During validation in response to a request from a requestor, only a legitimate requestor would have the required knowledge to validate against a minimal set of participating validators (those that possess currently valid shares). An attacker who would not have this knowledge may attempt to gain access in a manner that demonstrates a lack of knowledge regarding the shares. An imposter, for example, may attempt to validate multiple times, which demonstrates a lack of knowledge. This makes it more difficult for an attacker or imposter to determine the minimal set of validations required to obtain the shares of the secret or to obtain the secret.

Figure 7:
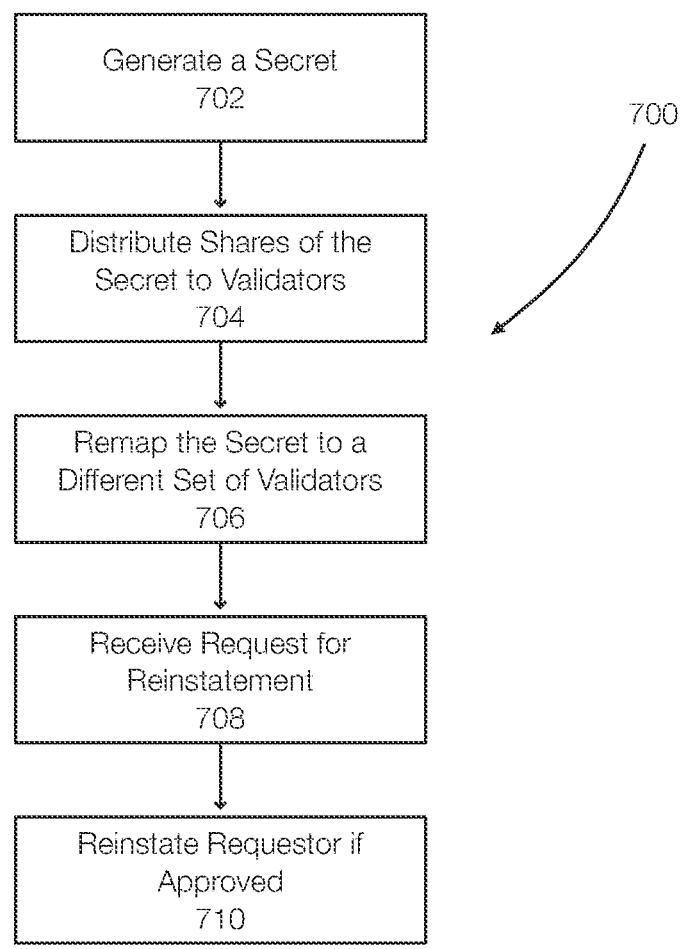
FIG. 7 discloses aspects of remapping shares among validators.

FIG. 7 discloses aspects of a method for validating a requestor. The method 700 is performed in the context of a voting operation. For example, aspects of mapping a secret (e.g., distributing shares to validators) may occur regardless of whether a voting operation is occurring. A requestor that is recently locked out may have knowledge regarding the validators that currently have shares because a valid requestor is aware of the remapping operations.

A valid requestor, for example, may be able to direct a request to the validators that have the shares. An attacker, however, would not know who to direct requests to. A requestor that makes multiple requests may be deemed suspicious as this indicates a lack of knowledge regarding the manner in which shares of a secret are mapped/distributed or remapped/redistributed to validators.

The method 700 may include generating 702 a secret. Shares of the secret are distributed 704 or mapped to a set of validators. Each of the validators may receive a different share and may be able to validate a requestor using different characteristics.

At some point, the secret is remapped 706 to a different or new set of validators. The new set of validators may have some overlap with the previous set of validators. Remapping 706 the secret may include generating a new secret, invalidating the old secret, and distributing shares of the new secret to the new set of validators.

At this point (or at another point of the method 700), a request for reinstatement 708 may be received. If the secret is successfully validated as described previously, the requestor may be reinstated 710. Alternatively, the request may be rejected if the requestor demonstrates a lack of knowledge regarding the secret or the manner in which shares are distributed. This may be in addition to the various identity tests that may be performed by the validators prior to providing their share for reconstruction of the secret.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. Also, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, identity and/or access control operations, reinstatement operations, voting operations, certificate related operations, or the like or combination thereof. More generally, the scope of the invention embraces any operating environment in which the disclosed concepts may be useful.

Example cloud computing environments, which may or may not be public, include storage environments that may provide data protection or data storage functionality for one or more clients. Another example of a cloud computing environment is one in which processing, data protection, and other services may be performed on behalf of one or more clients or tenants. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, replication services, backup servers, restore servers, backup clients, and restore clients, for example, may likewise take the form of software, physical machines, containers, or virtual machines (VMs), though no particular component implementation is required for any embodiment.

Example embodiments of the invention are applicable to any system capable of storing and handling various types of objects, in analog, digital, or other form.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: distributing shares of a secret to a set of validators, after a period of time, remapping the secret to a new set of validators, distributing the shares of the secret to the new set of validators based on the remapping, receiving a request for reinstatement from a requestor after the remapping, reconstructing the secret from a sufficient number of the shares if the requestor passes identity tests performed by the sufficient number of the set of new validators, wherein the requester is reinstated as an admin if the secret is successfully reconstructed.

Embodiment 2. The method of embodiment 1, wherein a voting operation is performed in response to the admin losing access to the system and the requestor is purporting to be the admin, wherein a certificate of the admin has expired and the admin cannot access the system, wherein the sufficient number is at least a majority of the new set of validators.

Embodiment 3. The method of embodiment 1 and/or 2, wherein remapping the secret includes generating a new secret and dividing the new secret into new shares and distributing the new shares to the new set of validators.

Embodiment 4. The method of embodiment 1, 2, and/or 3, further comprising detecting that the requestor is an attacker when the request is related to the secret rather than the new secret or when the request is directed to the set of validators rather than the new set of validators.

Embodiment 5. The method of embodiment 1, 2, 3, and/or 4, wherein the identity tests include log-based tests, identity validation tests, digital asset related tests, and/or geographical validation tests.

Embodiment 6. The method of embodiment 1, 2, 3, 4, and/or 5, wherein the new set of validators includes validators that use different characteristics to perform identity tests.

Embodiment 7. The method of embodiment 1, 2, 3, 4, 5, and/or 6, further comprising organizing the validators into groups, wherein each group is associated with characteristics that are different from characteristics of other groups, wherein at least one validator in each of the groups receives one of the shares.

Embodiment 8. The method of embodiment 1, 2, 3, 4, 5, 6, and/or 7, wherein the validators include other admins, other tenant admins, and/or applications.

Embodiment 9. The method of embodiment 1, 2, 3, 4, 5, 6, 7, and/or 8, further comprising terminating a voting operation when the new secret cannot be reconstructed, when an insufficient number of the new shares are received, and/or one or more of the new shares is counterfeit.

Embodiment 10. A method comprising: distributing shares of a secret to a set of validators, after a period of time, remapping the secret to a new set of validators, wherein remapping the secret includes: generating a new secret and dividing the new secret into new shares, distributing the new shares to a new set of validators, receiving a request for reinstatement from a requestor after the new secret has been generated, reconstructing the new secret from a sufficient number of the new shares if the requestor passes identity tests performed by the sufficient number of the set of new validators, wherein the requester is reinstated as an admin if the new secret is successfully reconstructed.

Embodiment 11. The method of embodiment 10, wherein a voting operation is performed in response to the admin losing access to the system and the requestor is purporting to be the admin, wherein a certificate of the admin has expired and the admin cannot access the system and wherein the sufficient number is at least a majority of the new set of validators.

Embodiment 12. The method of embodiment 10 and/or 11, further comprising detecting that the requestor is an attacker when the request is related to the secret rather than the new secret or when the request is directed to the set of validators rather than the new set of validators.

Embodiment 13. The method of embodiment 10, 11, and/or 12, wherein the identity tests include log-based tests, identity validation tests, digital asset related tests, and/or geographical validation tests.

Embodiment 14. The method of embodiment 10, 11, 12, and/or 13, wherein the new set of validators includes validators that use different characteristics to perform identity tests.

Embodiment 15. The method of embodiment 10, 11, 12, 13, and/or 14, further comprising organizing the validators into groups, wherein each group is associated with characteristics that are different from characteristics of other groups, wherein at least one validator in each of the groups receives one of the shares.

Embodiment 16. The method of embodiment 10, 11, 12, 13, 14, and/or 15, wherein the validators include other admins, other tenant admins, and/or applications.

Embodiment 17. The method of embodiment 10, 11, 12, 13, 14, 15, and/or 16, further comprising terminating a voting operation when the new secret cannot be reconstructed, when an insufficient number of the new shares are received, and/or one or more of the new shares is counterfeit.

Embodiment 18. A method comprising: distributing shares of a secret to a set of validators, receiving a request for reinstatement from a requestor, receiving a number of the shares from the validators at a voting engine, reconstructing the secret if a sufficient number of the shares are received from the set of validators, wherein the requester is reinstated as an admin if the new secret is successfully reconstructed.

Embodiment 19. The method of embodiment 18, wherein each of the validators in the set of validators performs an identity test prior to providing their shares to the voting engine.

Embodiment 20. The method of embodiment 19 and/or 20, further comprising redistributing the shares to a new set of validators or redistributing new shares of a new secret to the new set of validators, wherein the requestor is identified as an attacker if shares of the secret are requested or if the request is directed to the set of validators rather than the new set of validators.

Embodiment 21. A method for performing any of the operations, methods, or processes, or any portion of any of these, or any combination thereof disclosed herein.

Embodiment 22. A non-transitory storage medium having stored therein instructions that are executable by one or more hardware processors to perform operations comprising the operations of any one or more of embodiments 1-21.

Embodiment 23. A system comprising one or more hardware processors configured to perform the operations of any one or more of embodiments 1-21.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, engine, or agent may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
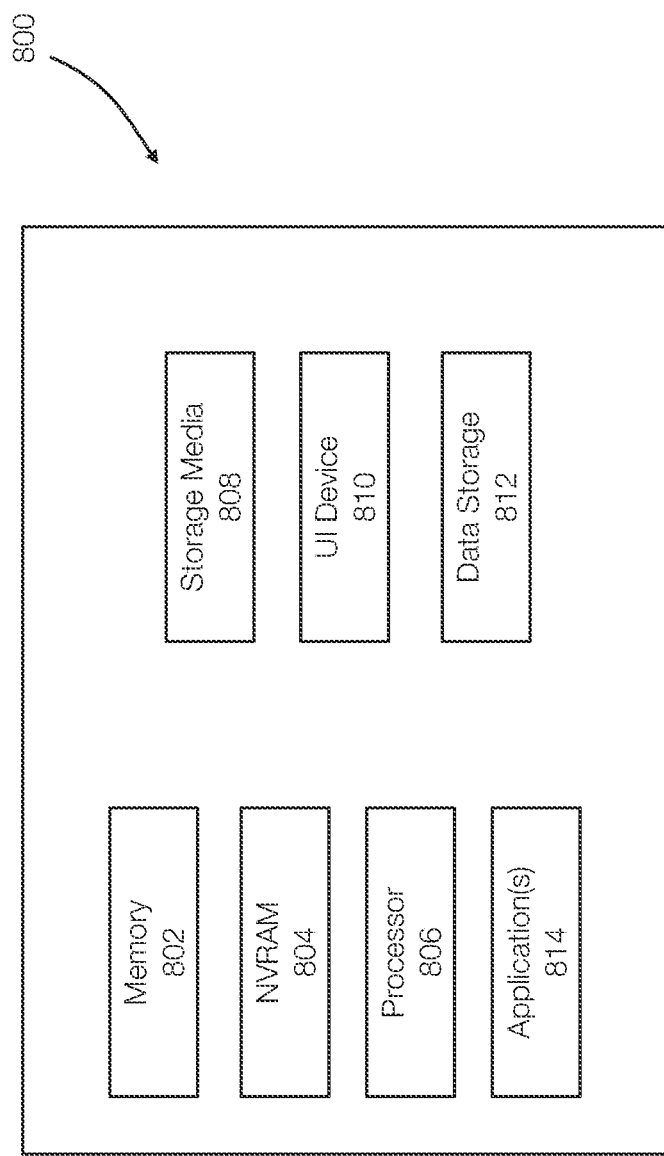
FIG. 8 discloses aspects of a computing device, system, or entity.

With reference briefly now to FIG. 8, any one or more of the entities disclosed, or implied, by the Figures, and/or elsewhere herein, may take the form of, or include, or be implemented on, or hosted by, a physical computing device, one example of which is denoted at 800. Also, where any of the aforementioned elements comprise or consist of a virtual machine (VM), that VM may constitute a virtualization of any combination of the physical components disclosed in FIG. 8. The device 800 may represent a computing environment, such as the access services 102, the cloud system 112, and/or computing devices of the tenants 128, and may represent a cluster of servers, or the like.

In the example of FIG. 8, the physical computing device 800 includes a memory 802 which may include one, some, or all, of random-access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid-state device (SSD) storage. Also, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   distributing shares of a secret to a set of validators;
   after a period of time, remapping the secret to a new set of validators;
   distributing the shares of the secret to the new set of validators based on the remapping;
   receiving a request for reinstatement from a requestor after the remapping, wherein a voting operation is performed in response to the requestor losing access to the system and the requestor is purporting to be an admin, wherein a certificate of the admin has expired and the admin cannot access the system;
   reconstructing the secret from a sufficient number of the shares if the requestor passes identity tests performed by the sufficient number of the set of new validators during the voting operation, wherein the requester is reinstated as an admin if the secret is successfully reconstructed, wherein the sufficient number is at least a majority of the set of new validators.

2. The method of claim 1, wherein remapping the secret includes generating a new secret and dividing the new secret into new shares and distributing the new shares to the new set of validators.

3. The method of claim 2, further comprising detecting that the requestor is an attacker when the request is related to the secret rather than the new secret or when the request is directed to the set of validators rather than the new set of validators.

4. The method of claim 1, wherein the identity tests include log-based tests, identity validation tests, digital asset related tests, and/or geographical validation tests.

5. The method of claim 1, wherein the new set of validators includes validators that use different characteristics to perform identity tests.

6. The method of claim 5, further comprising organizing the validators into groups, wherein each group is associated with characteristics that are different from characteristics of other groups, wherein at least one validator in each of the groups receives one of the shares.

7. The method of claim 1, wherein the validators include other admins, other tenant admins, and/or applications.

8. The method of claim 1, further comprising terminating the voting operation when the new secret cannot be reconstructed, when an insufficient number of the new shares are received, and/or one or more of the new shares is counterfeit.

9. A non-transitory storage medium having stored therein instructions that are executable by one or more hardware processors to perform operations comprising:
distributing shares of a secret to a set of validators;
after a period of time, remapping the secret to a new set of validators, wherein remapping the secret includes:
generating a new secret and dividing the new secret into new shares;
distributing the new shares to a new set of validators;
receiving a request for reinstatement from a requestor after the new secret has been generated, wherein a voting operation is performed in response to the requestor losing access to the system and the requestor is purporting to be the admin, wherein a certificate of the admin has expired and the admin cannot access the system;
reconstructing the new secret from a sufficient number of the new shares if the requestor passes identity tests performed by the sufficient number of the set of new validators during the voting operation, wherein the requester is reinstated as an admin if the new secret is successfully reconstructed, wherein the sufficient number is at least a majority of the new set of validators.

10. The non-transitory storage medium of claim 9, further comprising detecting that the requestor is an attacker when the request is related to the secret rather than the new secret or when the request is directed to the set of validators rather than the new set of validators.

11. The non-transitory storage medium of claim 9, wherein the identity tests include log-based tests, identity validation tests, digital asset related tests, and/or geographical validation tests.

12. The non-transitory storage medium of claim 9, wherein the new set of validators includes validators that use different characteristics to perform identity tests.

13. The non-transitory storage medium of claim 12, further comprising organizing the validators into groups, wherein each group is associated with characteristics that are different from characteristics of other groups, wherein at least one validator in each of the groups receives one of the shares.

14. The non-transitory storage medium of claim 9, wherein the validators include other admins, other tenant admins, and/or applications.

15. The non-transitory storage medium of claim 9, further comprising terminating the voting operation when the new secret cannot be reconstructed, when an insufficient number of the new shares are received, and/or one or more of the new shares is counterfeit.

16. A method comprising:
distributing shares of a secret to a set of validators;
redistributing the shares to a new set of validators or redistributing new shares of a new secret to the new set of validators;
receiving a request for reinstatement from a requestor, wherein the requestor is identified as an attacker if shares of the secret are requested or if the request is directed to the set of validators rather than the new set of validators;
receiving a number of the shares from the validators at a voting engine, wherein each of the validators in the set of validators performs an identity test prior to providing their shares to the voting engine;
reconstructing the secret if a sufficient number of the shares are received from the set of validators, wherein the requester is reinstated as an admin if the new secret is successfully reconstructed.

* * * * *